April 9, 1963    S. M. LINDBLAD    3,084,411
BUCKLES FOR AUTOMOBILE SAFETY BELTS AND THE LIKE
Filed Aug. 19, 1960
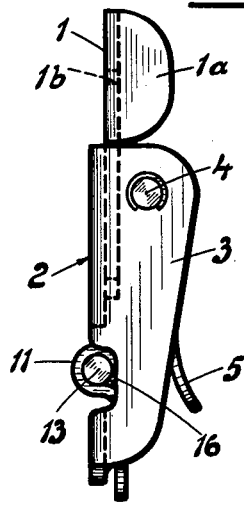
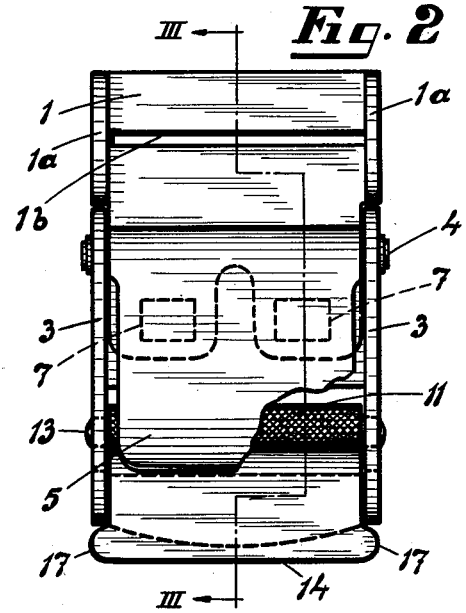
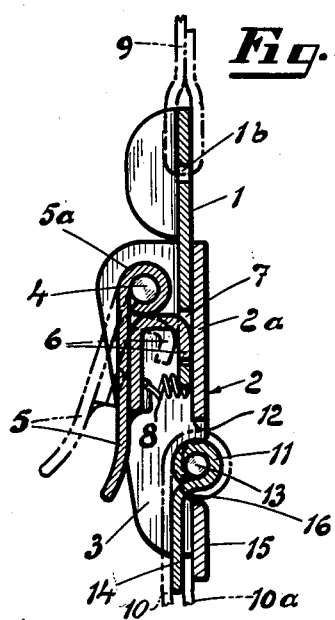
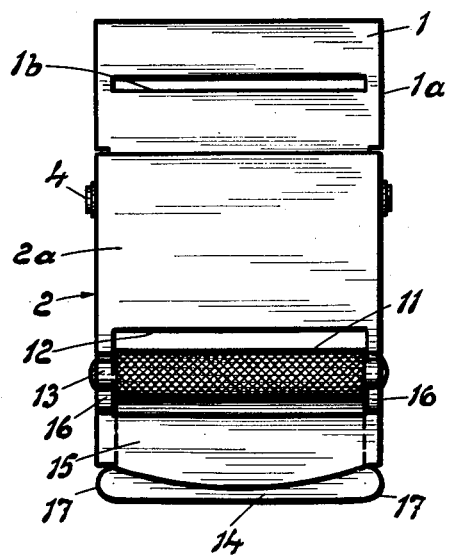
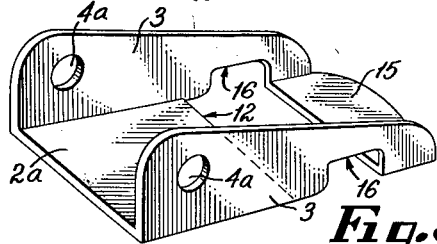
INVENTOR
STIG MARTIN LINBLAD
BY Linton and Linton
ATTORNEYS

Patent text 3,084,411
BUCKLES FOR AUTOMOBILE SAFETY
BELTS AND THE LIKE
Stig Martin Lindblad, Vargarda, Sweden
Filed Aug. 19, 1960, Ser. No. 50,645
Claims priority, application Sweden Aug. 27, 1959
1 Claim. (Cl. 24—193)

The present invention relates to buckles for automobile safety belts and the like of the kind comprising two detachably interconnectable fastening members attached to the free ends of the two belt parts to be connected. More specifically, the present invention relates to belt buckles of this kind wherein, in order to allow adjustment of the effective length of the belt, one of said fastening members is provided with an adjustment roller rotatably mounted in a slot-shaped opening in a flat portion of the last-mentioned fastening member, one part of the belt being placed around said roller in such a manner, that when said belt part is stretched, the roller will be displaced towards a member which de-limits said opening at one side thereof, so that the end portion of said belt part which passes from said roller over said bar will be clamped between the roller and that edge of said bar which faces the opening.

Previously known buckles of the kind set forth above have the drawback that when the safety belt is subjected to large tensile stresses, that portion of the belt which is clamped between the adjustment roller and a member and which has a relatively small area, will be subjected to such a heavy clamping action per unit area that the belt will be damaged and likely to break.

The present invention has for its object to overcome this drawback by distributing the clamping action occurring when the belt is stretched, over a larger surface area thereof, so that the risk of breaking or damage of the belt is eliminated.

Accordingly to the present invention this is attained by the provision of a flat clamping member rigidly connected with said adjustment roller in substantially tangential relation thereto and extending over this member, so that when the belt part placed over said flat clamping member is stretched, the end portion of the belt placed between the clamping member and the bar will be clamped also between said flat clamping member and said bar.

In a preferred embodiment of the present invention, the adjustment roller is formed by a portion of a plate which portion is bent into cylindrical shape around a pivot pin, the remaining, substantially flat portion of said plate extending over said bar and forming said clamping member.

One embodiment of the present invention is shown in the accompanying drawing wherein:

FIG. 1 is a view from one side of a buckle according to the present invention;

FIG. 2 is a front view of the buckle,

FIG. 3 is a section taken on the line III—III in FIG. 2, and

FIG. 4 is a rear view of the buckle.

FIGURE 5 shows in perspective details of the channel fastening member.

The buckle comprises a first fastening member 1 in the form of a plate with flanged edge portions 1a and a second substantially channel-shaped fastening member 2 having parallel upstanding side portions 3 formed on the edges of a flat bottom portion 2a. A pin 4 is mounted between the side portions 3 with its ends located in holes 4a therein. A flap 5 is journaled on pin 4 by means of an end portion 5a bent into cylindrical shape. To that side of the flap 5 which faces the flat bottom portion 2a of the second channel-shaped fastening member there are attached two depending projections or prongs or hooks 6, intended, when the flap is in the position shown in full lines in FIG. 3, to engage in two apertures 7 in the first fastening member 1 which is placed within the second channel-shaped fastening member 2 between the bottom 2a thereof and the flap 5, whereby the two fastening members 1 and 2 will be retained in the interconnected position. The flap 5 is maintained in this position by means of a spring 8 arranged between the flap and the bottom 2a of the fastening member 2. By swinging the flap 5 to the position shown in broken lines in FIG. 3 against the action of the spring 8, the projections 6 are moved out of engagement with the apertures 7 in member 1, so that the two fastening members 1 and 2 may be separated.

The fastening members 1 and 2 are intended to be secured to parts 9 and 10, respectively, of a safety belt. To this end the fastening member 1 is provided adjacent one edge with a slot 1b parallel with said edge, the end or part 9 of the safety belt being secured therein. The second fastening member 2 is provided with an adjustment holding member 11 around which the other end 10 of the belt is intended to be placed and which in known manner permits adjustment of the effective belt length. The adjustment holding member 11 which is situated in a transverse, slot-like opening 12 in the bottom portion 2a of the second fastening member 2, is made by bending one edge portion of a substantially rectangular plate into the form of a cylinder around a pin 13, the remaining extended flat plate portion 14 of 11 extending substantially tangentially from the cylinder being positioned at the front end of an extended flat plate 15 connecting the side portions 3 of the second fastening channel member 2 and defining one edge of the opening 12, said plate being in the same plane with the rest of the bottom portion 2a of second fastening member 2 and constituting a continuation thereof.

The end portions of the pin 13 project slightly outside the cylinder portion of holding member 11 and are placed in the several positions of use of the buckle, in notches 16 in the side portions 3 of channel fastening member 2, the pin being displaceable in said notches towards and away from the plate 15. The portion 14 projecting from the adjustment roller cylinder portion of adjustment holding member 11 is provided at the edge opposite the roller with two lateral projections 17 which prevent the adjustment roller and the flat portion 14 projecting therefrom from falling out through the slot opening 12. To connect the belt end 10 to the fastening member 2, the free end 10a of the belt is first passed through the slot opening 12 between the adjustment roller 11 and that edge of the slot opening 12 which is opposite the bar 15. The belt end is thereafter passed over the adjustment roller and back through the slot opening 12 between the adjustment holding member 11 and the bar 15, and, finally, out through the space between one side of the bar 15, and the flat portion 14 projecting from the adjustment cylinder.

When the belt end 10 is stretched, the adjustment roller 11 will be displaced in known manner towards the bar 15 and thereby clamp the end portion 10a of the belt part 10 between itself and the edge of the bar 15 facing the opening 12. Due to the portion 14 projecting from the adjustment cylinder, a considerable clamping action is further applied to that portion of belt end portion 10a which is situated between said flat portion 14 and the flat side of the bar 15 (see FIG. 3).

The present invention is not limited to the particular embodiment hereinbefore described and as shown in the drawing, said embodiment being susceptible of modifications with respect to its details without departing from the spirit of the present invention.

What I claim is:

A safety belt terminal fastening member comprising a channel shaped member having a flat bottom and two upstanding sides normal to said bottom, said channel shaped member having an intermediate transverse slot in said bottom and a recess in each of said sides opening into said bottom transverse slot, a pintle having each end loosely positioned in one of said side recesses whereby said pintle can both slide and rotate in said side recesses, a belt adjusting and holding member having an annular terminal portion fixedly extending around an intermediate portion of said pintle and further having an extended plate portion, said belt adjusting and holding member annular terminal portion being positioned in said bottom recess whereby one end of the belt may be adjustably passed around said annular terminal portion and held between said extended plate portion and the portion of said channel shaped member bottom between said bottom slot and an end of said bottom and means for connecting said channel shaped member to a second safety belt terminal fastening member.

References Cited in the file of this patent

UNITED STATES PATENTS

| | | |
|---|---|---|
| 565,868 | Washburne | Aug. 11, 1896 |
| 775,749 | Freeman | Nov. 22, 1904 |
| 861,111 | Gonce | July 23, 1907 |
| 1,234,818 | Sturrock | July 31, 1917 |
| 2,116,745 | Stuller | May 10, 1938 |
| 2,869,200 | Phillips | Jan. 20, 1959 |

FOREIGN PATENTS

| | | |
|---|---|---|
| 618,828 | Germany | Sept. 16, 1935 |